United States Patent [19]

Egami et al.

[11] Patent Number: 5,726,232
[45] Date of Patent: Mar. 10, 1998

[54] HEAT RESISTANT LUBRICATIVE RESIN COMPOSITION

[75] Inventors: Masaki Egami, Yokkaichi; Hideyuki Tsutsui, Kuwana, both of Japan

[73] Assignee: NTN Corporation, Osaka, Japan

[21] Appl. No.: 704,828

[22] Filed: Aug. 28, 1996

[30] Foreign Application Priority Data

Dec. 21, 1995 [JP] Japan .................................. 7-333469

[51] Int. Cl.$^6$ ................................................. C08K 3/32
[52] U.S. Cl. .................................. 524/414; 524/609
[58] Field of Search ............................ 524/414, 609

[56] References Cited

U.S. PATENT DOCUMENTS

| | | | |
|---|---|---|---|
| 4,333,850 | 6/1982 | Krueger | 252/389.2 |
| 4,909,961 | 3/1990 | Suzuki et al. | 524/496 |
| 4,935,473 | 6/1990 | Fukuda et al. | 524/609 |
| 4,988,756 | 1/1991 | Vives | 524/418 |
| 5,147,922 | 9/1992 | Murakami | 524/413 |
| 5,256,718 | 10/1993 | Yamamoto et al. | 524/411 |
| 5,470,901 | 11/1995 | Ishiwari et al. | 524/413 |

*Primary Examiner*—Joseph L. Schofer
*Assistant Examiner*—N. Sarafim
*Attorney, Agent, or Firm*—Nikaido Marmelstein Murray & Oram LLP

[57] ABSTRACT

A heat-resistant, lubricative resin composition which is low in friction and wear-resistant, and which is less likely to attack a soft alloy such as aluminum alloy, and a heat-resistant sliding bearing formed from such resin composition. Such heat-resistant, lubricative resin composition, adapted to be brought into sliding contact with a mating member made of an aluminum alloy, may be composed of 35-74% by weight of at least one heat-resistant thermoplastic resin selected from the group consisting of polyphenylene sulfide resins, thermoplastic polyimide resins having predetermined repeating units, polyether ketone resins, polycyanoarylether resins, polyamide-imide resins, polyether imide resins, polyether sulfonic resins. 10-45% by weight of a tetrafluoroethylene resin, and 16-30% by weight of lithium phosphate. Also, the resin composition may be made up of 35-80% by weight of the abovementioned heat-resistant thermoplastic resin, 10-45% by weight of a tetrafluoroethylene resin, 8-30% by weight of lithium phosphate, and 2-20% by weight of aromatic polyamide fiber. A heat-resistant sliding bearing may be formed from either of the above resin compositions.

5 Claims, 2 Drawing Sheets

HEAT RESISTANT LUBRICATIVE RESIN COMPOSITION

BACKGROUND OF THE INVENTION

This invention relates to a heat-resistant, lubricative resin composition for use as material for sliding members to be brought into sliding contact with aluminum alloy members used in a heating/fixing device and other kinds of sliding members, and a heat-resistant sliding bearing.

Sliding bearings of synthetic resin are now used in broader fields of art than before. It is required that such sliding bearings have high heat resistance so that they can exhibit good friction/wear properties at elevated temperatures.

Some of mating members of these bearings are made of a soft material such as aluminum alloy. Thus, bearings are required not to damage even such soft mating members.

Sliding bearings that are required to exhibit these properties include bearings for heating/fixing units in copying machines and laser beam printers. Such sliding bearings are used in the following manner.

Copiers and laser beam printers for transferring data or information on original images to a recording medium or transfer material in the form of charged images are generally called electrophotographic devices. FIG. 3 shows a heating/fixing unit for such a device. It has a heating roller 10 for fixing toner images on a tranfer material, and a press roller 11 for pressing the transfer material against the heating roller 10 while rotating.

The heating roller 10 is usually made of an aluminum alloy and heated by a heater 12 to about 150°–230° C. The press roller 11 is made of iron covered with e.g. silicone rubber. It is heated to about 70°–150° C. by heat transfer from the heating roller 10.

FIG. 4 shows a different heating/fixing unit. It has, instead of the metallic heating roller 10, an endless annular fixing film 15 made of a heat-resistant synthetic resin and having a release coating. A ceramic heater 16 is pressed against the press roller 11 through the fixing film 15 to improve heat transfer efficiency. The press roller 11 of this unit is heated to higher temperatures than the press roller 11 of the unit shown in FIG. 3, in which the metallic heating roller 10 is used, because it is provided very close to the ceramic heater 16.

The rollers, which are heated to high temperatures as described above, are supported at both ends by synthetic resin sliding bearings 13 and 14 (FIG. 3) or by bearings similar in shape to the bearing 14 (in the device of FIG. 4). Conventional such bearings were made of polyphenylene sulfide (PPS for short) resin, a thermoplastic resin having high heat resistance and excellent mechanical strength. PPS resin is a thermoplastic synthetic resin having good heat resistance and mechanical strength. To PPS resin, it is usual to add graphite, tetrafluoroethylene resin, lubricating oil, metallic oxides, aromatic polyamide resin, etc to improve its self-lubricity.

But such a heat-resistant, lubricative PPS resin composition cannot keep a sufficiently low friction coefficient under high-temperature, high-load conditions. Wear resistance also tends to drop.

Also, there have been developed resin compositions which are formed by adding to PPS resin a powdered synthetic resin having a higher heat resistance than PPS resin and tetrafluoroethylene resin. Unexamined Japanese Patent Publications 57-167348 and 63-175065 disclose compositions formed by adding an aromatic polyester resin and tetrafluoroethylene resin to PPS resin. These compositions exhibit good wear resistance at normal temperatures.

But the composition formed by adding tetrafluoroethylene and an aromatic polyester resin to PPS resin tends to damage a mating member made of an aluminum alloy (usually an Mg-containing alloy) and be worn by the mating member if the composition and the mating member are slid against each other at a high temperature, e.g. about 200° C.

It is possible to improve wear resistance of such compositions by adding carbon fiber. But such carbon fiber may damage the mating member if it is made of a soft material such as an aluminum alloy. Metallic powder produced from the damaged mating member will worsen the friction/wear properties still further.

Unexamined Japanese patent Publications 2-219849 and 3-212442 disclose resin compositions formed by adding tetrafluoroethylene resin and phosphates of alkaline metals or alkaline earth metals to synthetic resin which is the main ingredient.

These compositions show relatively good friction/wear properties when brought into sliding contact with a stainless steel member or a member with similar hardness at room temperature. But if they are slid against a soft mating member made of an aluminum alloy at high temperatures (about 200° C.), they will damage the mating member and will be abraded by the mating member.

An object of this invention is to provide a heat-resistant, lubricative resin composition which is lower friction and higher in wear resistance than conventional PPS lubricative resin compositions and which is less likely to attack a member made of a soft alloy such as aluminum alloy, and a heat-resistant sliding bearings formed from such resin composition.

SUMMARY OF THE INVENTION

According to the present invention, there is provided a heat-resistant, lubricative resin composition comprising 35–74% by weight of at least one heat-resistant thermoplastic resin selected from the group consisting of polyphenylene sulfide resins, thermoplastic polyimide resins having repeating units expressed by the Formula below, polyether ketone resins, polycyanoarylether resins, polyamide-imide resins, polyether imide resins, polyether sulfonic resins, 10–45% by weight of a tetrafluoroethylene resin, and 16–30% by weight of lithium phosphate,

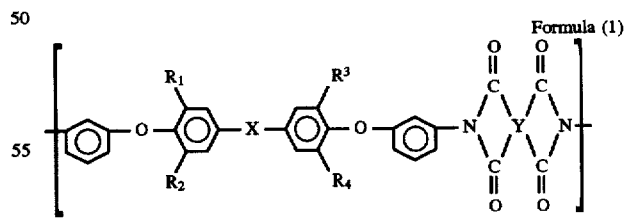

Formula (1)

(wherein X is a direct bond or a group selected from the group consisting of a hydrocarbon group having 1–10 carbon atoms, a hexafluorinated isopropylidene group, a carbonyl group, a thio group and a sulfonic group; R1–R4 are hydrogen, lower alkyl groups with 1–5 carbon atoms, lower alkoxy groups with 1–5 carbon atoms, chlorine or bromine, and may be the same or different from one another; and Y is at least one tetravalent group selected from the group shown by the following formulas)

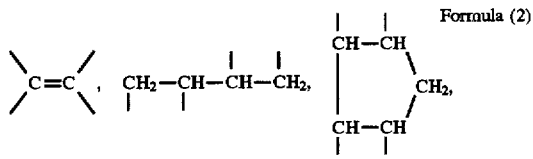

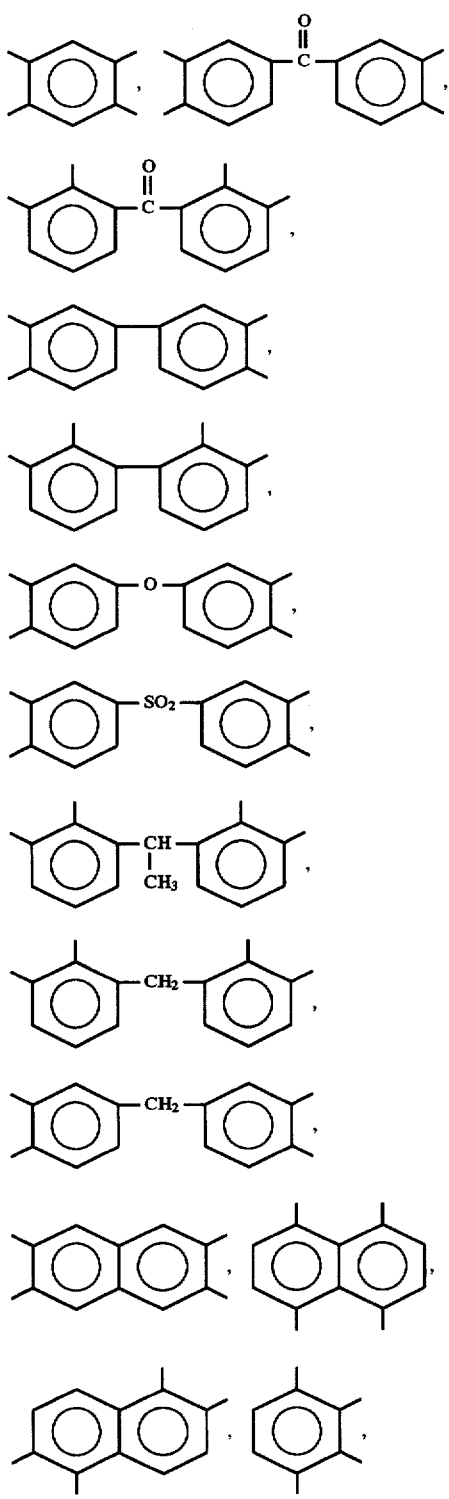

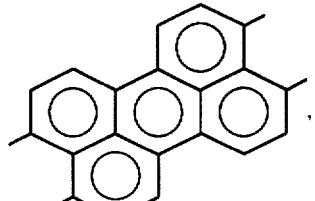

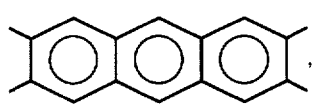

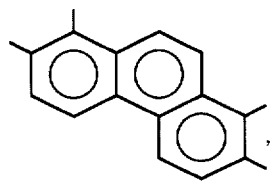

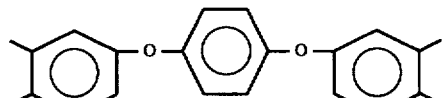

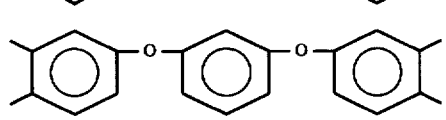

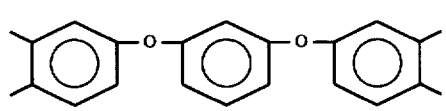

From another aspect of this invention, there is provided a heat-resistant, lubricative resin composition comprising 35–80% by weight of at least one heat-resistant thermoplastic resin selected from the group consisting of polyphenlene sulfide resins, thermoplastic polyimide resins having repeating units expressed by Formula (1) above, polyether ketone resins, polycyanoarylether resins, polyamide-imide resins, polyether imide resins, polyether sulfonic resins, 10–45% by weight of a tetrafluoroethylene resin, 8–30% by weight of lithium phosphate, and 2–20% by weight of aromatic polyamide fiber.

There is also provided a heat-resistant sliding bearing formed from either of the abovementioned heat-resistant, lubricative resin compositions.

The heat-resistant, lubricative resin composition according to this invention, which comprises heat-resistant resins and further contains predetermined amounts of tetrafluoroethylene resin, which is a material known for its excellent sliding property, and lithium phosphate forms a transferred film that is sufficiently heat-resistant and shows excellent lubricating properties on the surface of the mating member. The film will keep the surface of the mating member damage-free, while exhibiting good lubricating properties.

Other features and objects of the present invention will become apparent from the following description made with reference to the accompanying drawings, in which:

DETAILED DESCRIPTION OF THE PREFERRED EMBODIMENT

Figure 1:
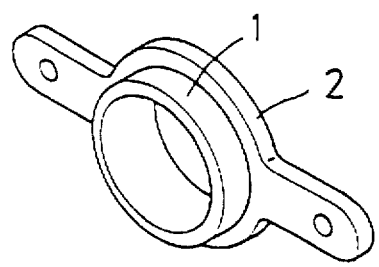
FIG. 1 is a perspective view of an embodiment.

The mating member to be brought into sliding contact with the heat-resistant, lubricative resin composition according to the present invention is not limited in its composition, provided it is made of an ordinary aluminum alloy, i.e. an alloy whose main component is aluminum. But one can expect especially good results if the mating member is made of an Al-Mg alloy (JIS: A5056) or an Al-Mg-Si alloy JIS: A6063).

PPS resins which can be used in this invention include polymers having repeating units shown below:

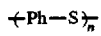  Formula (3)

(wherein Ph is

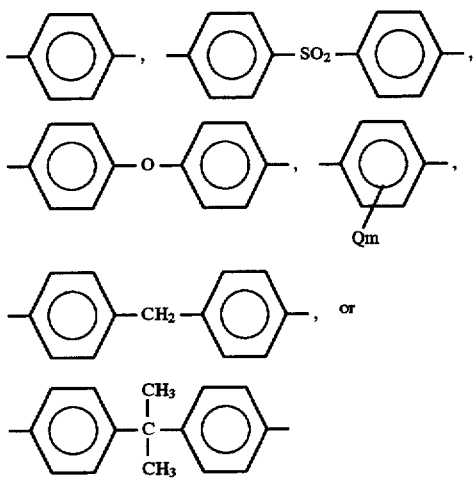

Q is a halogen of F, Cl or Br, or $CH_3$, and m is an integer 1, 2, 3 or 4.)

A typical polymer of this type has the repeating unit shown by the Formula below.

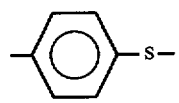  Formula (4)

This type of polymer is available from Philips Petroleum in USA under the trademark of "RYTON". A method of manufacturing this polymer is disclosed in U.S. Pat. No. 3,354,129.

In this method, "RYTON" is manufactured by reacting p-dichlorobenzene with disulfide soda under pressure at 160°250 C. in an N-methylpyrolidone solvent. In this method, it is possible to manufacture a molten blend having a desired melt viscosity by adjusting during heat treatment the degree of polymerization, which is determined by the degree of crosslinking in the resin. Instead of "RYTON", a straight-chain, uncrosslinked PPS resin may be used.

The thermoplastic polyimide (TPI for short) resin used in this invention has the structure represented by Formula (1). It is formed by reacting an ether diamine represented by the following Formula (5) with a tetracarboxylic dianhydride to obtain a polyamidic acid and cyclodehydrating the polyamidic acid. Typical thermoplastic polyimide resins (in which R1-R4 are all hydrogen atoms) include one sold by Mitsui Toatsu Chemical under the trade name "AURUM". The manufacturing method is well-known, as disclosed in Unexamined Japanese Patent Publications 61-143478, 62-68817 and 62-86021.

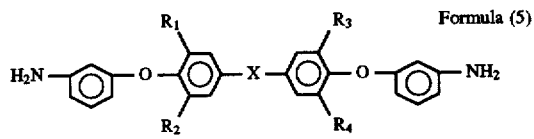  Formula (5)

This thermoplastic polyimide resin shows themoplasticity while maintaining its inherent heat resistance, so that the resin composition according to the present invention can be molded with relative ease by compression molding, injection molding, extrusion molding or any other melt-molding method.

Specific diamines represented by Formula (5) include:
bis(4-(3-aminophenoxy)phenyl)methane,
1,1-bis(4-(3-aminophenoxy)phenyl)ethane,
1,2-bis(4-(3-aminophenoxy)phenyl)ethane,
2,2-bis(4-(3-aminophenoxy)phenyl)propane
2-(4-(3-aminophenoxy)phenyl)-2-(4-(3-aminophenoxy)-3-methylphenyl)propane,
2,2-bis(4-(3-aminophenoxy)-3-methylphenyl)propane,
2-(4-(3-aminophenoxy)phenyl)-2-(4-(3-aminophenoxy)-3,5-dimethylphenyl)propane,
2,2-bis(4-(3-aminophenoxy)-3,5-dimethylphenyl)propane,
2,2-bis(4-(3-aminophenoxy)phenyl)butane,
2,2-bis(4-(3-aminophenoxy)phenyl-1,1,1,3,3,3-hexafluoropropane,
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
bis(4-(3-aminophenoxy)phenyl)ketone,
bis(4-(3-aminophenoxy)phenyl)sulfide,
bis(4-(3-aminophenoxy)phenyl)sulfone. A mixture thereof may be used.

Other diamines may be mixed in such amounts that the melt-flowability of the thermoplastic polyimide resin will not be impaired. The following dimethyl amines may be mixed into the composition:
m-aminobenzyl amine,
p-aminobenzyl amine,
3,3'-diaminodiphenylether,
3,4'-diaminodiphenylether,
4,4'-diaminodiphenylether,
3,3'-diaminodiphenylsulfide,
3,4'-diaminodiphenylsulfide,
4,4'-diaminodiphenylsulfide,
3,3'-diaminodiphenylsulfone,
3,4'-diaminodiphenylsulfone,
4,4'-diaminodiphenylsulfone,
3,3'-diaminobenzophenone,
3,4'-diaminobenzophenone,
4,4'-diaminobenzophenone,
1,3-bis(3-aminophenoxy)benzene,
1,3-bis(4-aminophenoxy)benzene,
1,4-bis(3-aminophenoxy)benzene,
1,4-bis(4-aminophenoxy)benzene,
2,2-bis(4-(4-aminophenoxy)phenyl)propane,
4,4'-bis(4-aminophenoxy)biphenyl,
4,4'-bis(4-aminophenoxy)ketone,
bis(4-(4-aminophenoxy)phenyl)sulfide, and
bis(4-(4-aminophenoxy)phenyl)sulfone.
They should be added by 30% or less, preferably 5% or less.

The most desirable thermoplastic polyimide resin is obtained by reacting one of the abovementioned diamines with a tetracarboxylic dianhydride in an organic solvent and dehydrating them for ring closure. The tetracarboxylic dianhydride used in this reaction is represented by the Formula (6) (Y in this formula represents the same as Y in Formula 2).

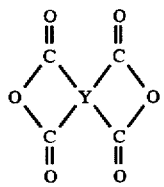

Formula (6)

Tetracarboxylic dianhydride represented by Formula (6) include:
ethylene tetracarboxylic dianhydride,
1,2,3,4-butanetetracarboxylic dianhydride,
cyclopentanecarboxylic dianhydride,
pyromellitic acid dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis (3 4-dicarboxyphenyl)methane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride,
1,2,7,8-phenanthrenetetracarboxylic dianhydride,
4,4'-(p-phenylenedioxy)diphthalic dianhydride, and
4,4'-(m-phenylenedioxy)diphthalic dianhydride.
In this invention, these anhydrides may be singly or in combination.

The aromatic polyether ketone resin (PEK for short) used in this invention is a polymer having one of the repeating units shown by the Formula (7), or a polymer in which one of the repeating units shown by Formula (8) coexists with one of the repeating units shown by Formula (7) so that the properties intrinsic to PEK will not be lost.

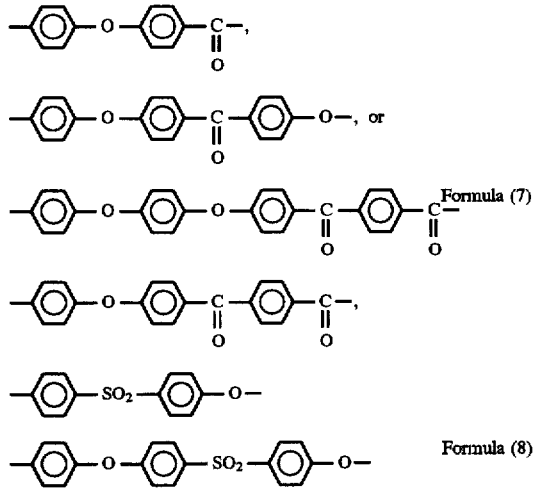

Formula (7)

Formula (8)

Commercially available PEKs of this type include PEEK made by Victrex and shown by Formula (9), and PEK made by Victrex and having the structure shown by Formula (10), and Ultrapek made by BASF and having the structure shown by Formula (11). They can be manufactured by the well-known method as disclosed in Unexamined Japanese Patent Publication 54-90296.

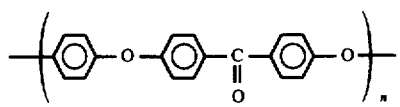

Formula (9)

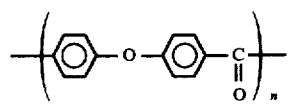

Formula (10)

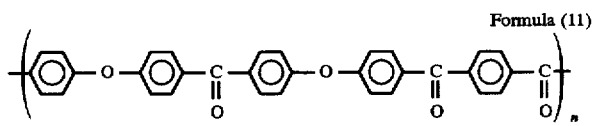

Formula (11)

The polycyanoarylether resin (PEN for short) used in this invention may be a compound comprising repeating units shown by Formula (12), or a polymer in which repeating units shown by Formula (13) coexist with the repeating units shown by Formula (12) at the rate of about 20 mol % or less so that the properties intrinsic in PEN will not be lost.

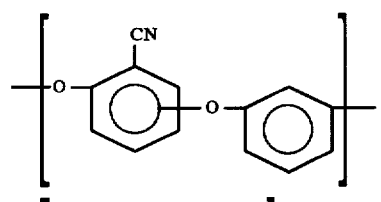

Formula (12)

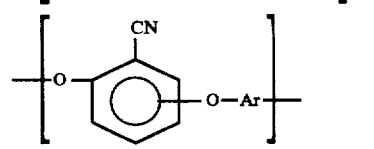

Formula (13)

(wherein Ar is an aryl group such as

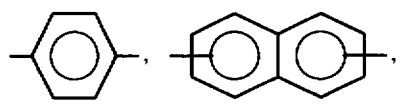

,

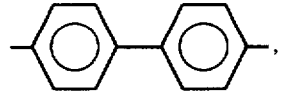

,

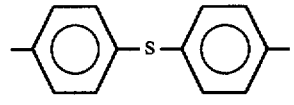

,

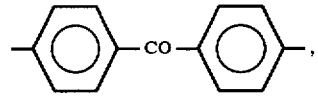

,

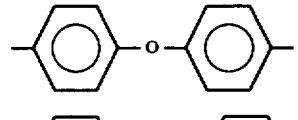

,

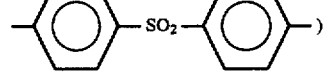

)

Preferably, such PEN has a reduced viscosity ($\eta sp/C$) of 0.3 g/dl or higher at 60° C. in a 0.2 g/dl p-chlorophenol solution. Such PEN is sold by IDEMITSU KOSAN as polyether nitrile (ID300). Also, a method of manufacturing PEN is disclosed in Unexamined Japanese Patent Publication 63-3059.

The polyamide-imide resin (PAI for short) used in this invention is the one shown by Formula (14). Part of the imide bonds may be in the form of amic acid bonds as split precursors. R1 is an aromatic group having at least one benzene ring, its bivalent having two carbonyl groups bonded to adjacent carbon atoms in the benzene ring in R1.

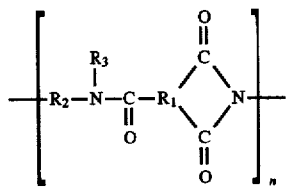

Formula (14)

(wherein R1 is a trivalent aromatic group including at least one benzene ring, R2 is a bivalent organic group, and R3 is hydrogen, a methyl group or a phenyl group)

Preferably, R1 in Formula (14) has one of the structures shown by Formula (15).

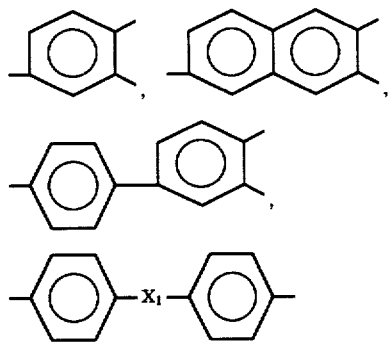

Formula (15)

(wherein X1 is

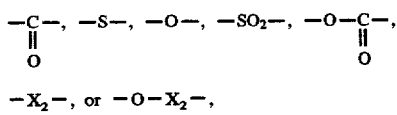

$-X_2-$, or $-O-X_2-$, and X2 is a saturated aliphatic hydrocarbon group having 1 to 6 carbon atoms such as

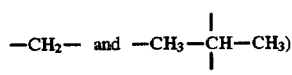

R2 in Formula (14) is preferably $-(CH_3)_m-$ (m indicates 4–12 saturated aliphatic hydrocarbon groups), or have the structure shown by Formula (16).

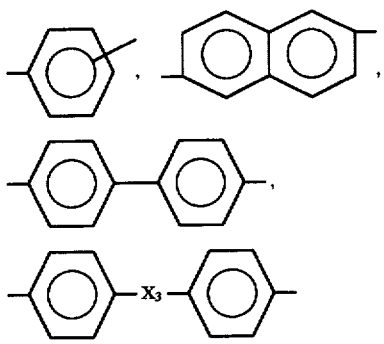

(wherein X3 is

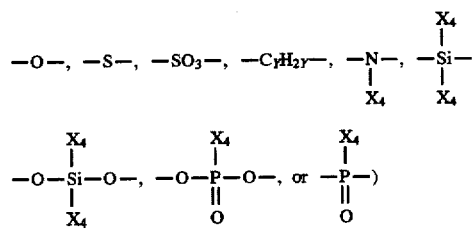

(wherein Y is one of the integers 1–3, and X4 is an aliphatic hydrocarbon group or an aromatic group having 1–6 carbon atoms)

A method for manufacturing such PAI is well-known as disclosed in U.S. Pat. No. 3,625,911 or Examined Japanese Patent Publication No. 50-33120. PAI can also be prepared by reacting an aromatic tricarboxylic acid anhydride as represented by Formula (17) or its derivative with an organic diamine given by the formula

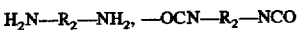

$H_2N-R_2-NH_2$, $-OCN-R_2-NCO$ (wherein R2 is the same as R2 in Formula 14 or 15) or its derivative at predetermined temperature for a predetermined period of time in a polar organic solvent such as dimethylacetamide, dimethylformamide or N-methylpyrolidone to produce a polyamic acid, and converting the polyamic acid into an imide by e.g. heating.

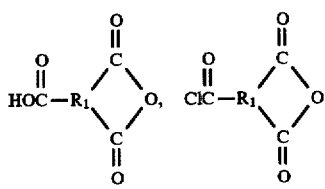

Formula (17)

PAIs formed by the last-mentioned method include one having the structure shown by Formula (18). Such PAI is commercially available from Amoco in USA under the name of Torlon (registered trademark).

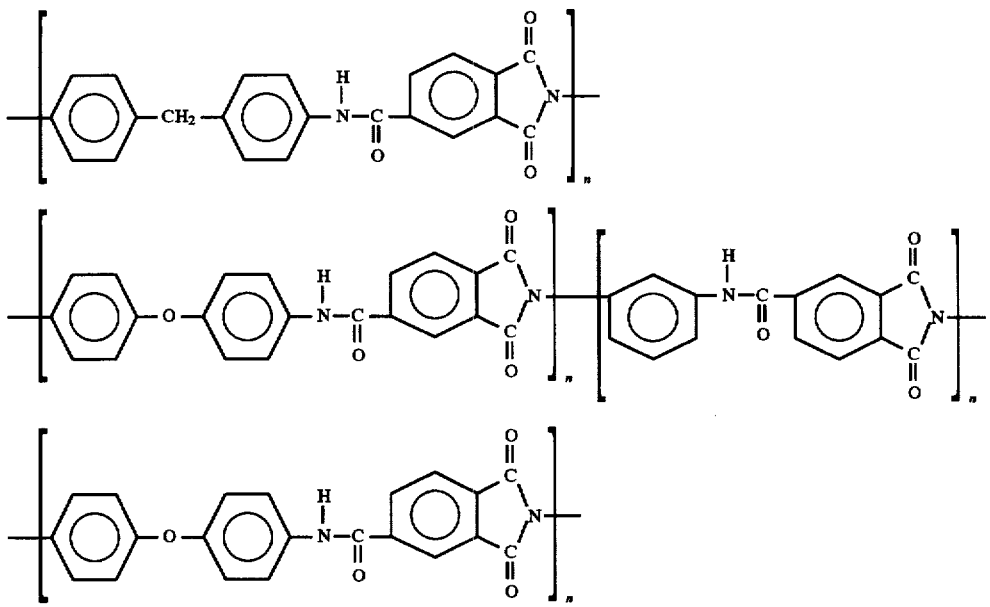

Formula (18)

By mixing such PEK, PEN or PAI in a predetermined ratio into the heat-resistant, lubricative resin composition, such a resin will fully exhibit its heat-resistant properties.

The polyetherimide resin added to the heat-resistant, lubricative resin composition according to this invention may be a polymer having repeating units represented by Formula (19). Such a polymer is sold by General Electric under the name of ULTEM.

The content of PTFE should be 10–45% by weight. If less than 10% by weight, the lubricating properties will not be improved. If over 45% by weight, moldability will deteriorate markedly. Preferably the content of PTFE should be 15–40% by weight.

The lithium phosphate used in this invention may be $Li_3PO_4$ or $2Li_3PO_4 \cdot H_2O$. But the anhydride is preferable in

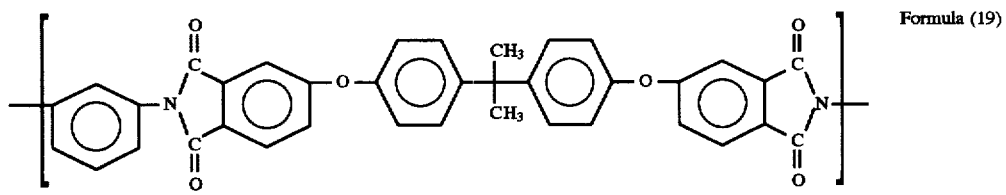

Formula (19)

The poyether sulfonic resin added to the heat-resistant, lubricative resin composition according to this invention may be a polymer having repeating units shown by Formula (20). Its commercial versions include Ultrason made by BASF, RADEL made by Amoco, and VICTREX PES made by Sumitomo Chemical.

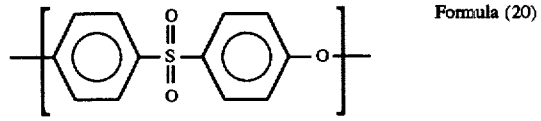

Formula (20)

Two or more of such heat-resistant resins may be used in combination. Preferable combinations include PPS and PEK, TPI and PEK, TPI and PEI, TPI and PES, PPS and PAI, PAI and PEI, and TPI, PEK and PEI.

The tetrafluoroethylene resin (PTFE) used in this invention may be any tetrafluoroethylene polymer. It may be in the form of powder for molding or pulverized powder for solid lubricant. Its commercial versions include Teflon 7J made by Mitsui-Dupont Fluorochemical, FLUON G163 by Asahi Glass, Polyflon M15, Low POLYMERS by DAIKIN Kogyo, and Hostaflon TF9205 by Hoechst. Also, PTFE modified with alkylvinylether may be used.

that no foaming due to dehydration occurs during the manufacturing process.

Such lithium phosphate is usually in the form of powder. But its form varies according to the manufacturing method and is not limited.

If powdered lithium phosphate is used, its particle diameter is preferably 0.1–400 μm for uniform dispersion and homogeneous physical properties. The lower limit is set at 0.1 μm because it is difficult both technically and economically to prepare powder having a particle diameter of less than 0.1 μm. If over 400 μm, friction/wear properties will not stabilize. Preferably, the particle diameter should be 0.5–100 μm.

The content of the lithium phosphate should be 16–30% by weight. If less than 16% by weight, the lubricating properties of the composition will not be improved sufficiently. If over 30% by weight, melt viscosity will increase, deteriorating moldability. Wear resistance will deteriorate too.

If aromatic polyamide fiber is added, the composition will show good lubricating properties even if the content of lithium phosphate is lowered to 8% by weight. But if its content is lower than 8% by weight, the lubricating properties will be insufficient.

The aromatic polyamide fiber used in this invention may have a meta or a para chemical structure. Good results were achieved where the fiber had a fiber length of 0.15–3 mm and an aspect ratio of 10–230. If the fiber length is less than 0.15 mm, wear resistance will be insufficient. If over 3 mm, it will be difficult to disperse fibers uniformly in the composition. If the aspect ratio is under 10, the fiber cannot improve wear resistance because such fiber is more like powder. If the aspect ratio is over 230, it is difficult to disperse fibers uniformly in the composition.

Commercially available aromatic polyamide fibers which can be used in this invention include KEVLAR, NOMEX by Dupont Toray Kevlar, TWARON by Japan Aramid, and Technola and CONEX by Teijin.

The content of such aromatic polyamide fiber should be 2–20% by weight. If less than 2% by weight, it is difficult to improve the wear resistance and lubricating properties of the composition. If over 20% by weight, the wear resistance will not improve but deteriorate instead.

These additives may be added to and mixed with the heat-resistant, thermoplastic resin in any known way. Typically, the resin as the main component and the other materials are dry-mixed separately or all together in a mixer such as a Henschel mixer, a ball mill or a tumbler mixer, and then supplied to an injection molding machine or a melt extruder that allows smooth melt mixing. Otherwise, these materials may be mixed by melting with heat rolls, a kneader, a Bumbury mixer or a melt extruder.

The composition according to this invention may be formed by compression molding, extrusion molding or injection molding. Otherwise, it may be mixed by melting, pulverized in a jet mill or a freeze crusher, and classified to a predetermined particle diameter or subjected to fluidized bed coating or electrostatic powder coating without classifying.

Also, the powder obtained may be dispersed in a solvent and spray-coated or dip-coated.

Further, various additives may be mixed into the lubricative composition comprising a heat-resistant thermoplastic resin as a main component. For example, in order to improve the lubricating properties of the composition, a wear resistance improver may be added. Such wear resistance improvers include carbon, graphite, mica, talc, wollastonite, metallic oxide powder, whiskers of calcium sulphate and other whiskers, molybdenum disulfide, aromatic polyester resin, phosphate, stearate, molten fluororesin and ultra-high-molecular-weight polyethylene.

The heat-resistant sliding bearing formed from the resin composition according to this invention is not limited in shape. Its shape is determined taking into account the shapes of the heating and press rollers, peripheral devices and the housing. For example, instead of forming the bearing from a single material, it may be formed by two-color molding method as shown in FIG. 1. That is, the bearing shown in FIG. 1 has its bearing portion 1 and fixing metal portion 2 formed from different materials.

Figure 2:
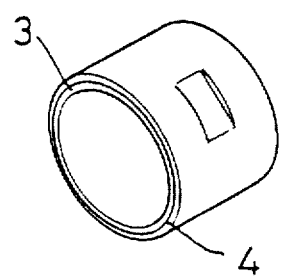
FIG. 2 is a perspective view of another embodiment.
Figure 3:
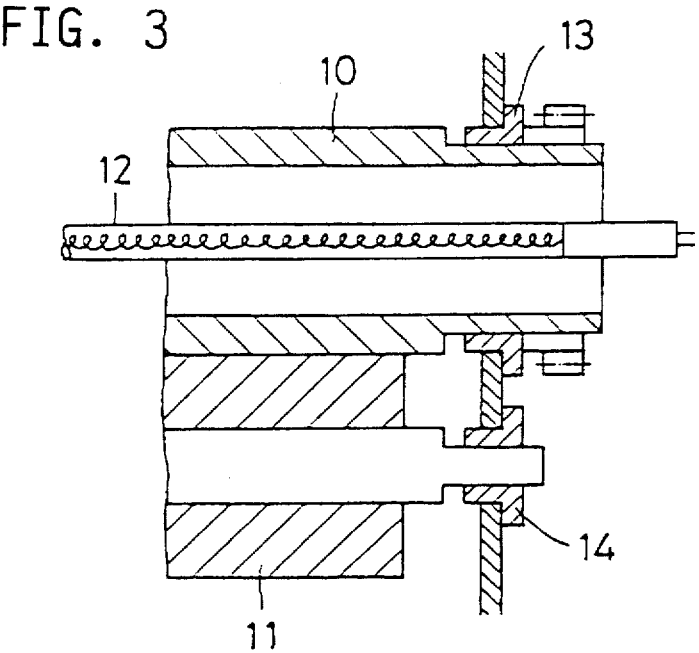
FIG. 3 is a sectional view of a heating/fixing unit, showing how bearings are arranged.
Figure 4:
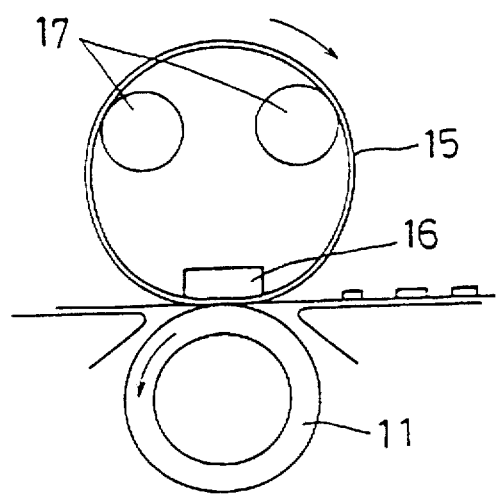
FIG. 4 is a sectional view of a different heating/fixing unit, showing how bearings are arranged.

Similarly, the heat-resistant bearing shown in FIG. 2 is formed by two-color molding method. That is, it comprises a bearing portion 3 and a resin portion 4 formed from a heat-resistant and heat-insulating resin such as PPS, PAI or TPI to which are optionally added inorganic or organic fillers.

In order to ensure dimensional stability of such bearings when used at high temperatures, it is preferable to eliminate any strains during molding by subjecting them to annealing treatment for 0.5–24 hours at temperatures within 100°–320° C. determined according to the type of resin.

(EXAMPLES)

Raw materials used in Examples according to this invention and Comparative Examples are shown below. The numbers in brackets coincide with the numbers of materials in the tables. The contents shown are all in weight percent.

(1) PPS resin (TOSO SUSTEEL: PPS #160), (2) PPS resin (KUREHA Chemical: KPS-W205), (3) thermoplastic polyimide resin (TPI) (Mitsui Toatsu Chemical: AURAM #450), (4) polyether ketone resin (PEK-1) (BASF: Ultrapek-A1000), (5) polyether ketone resin (PEK-2) (VICTREX: PEEK 150P, (6) polycyanoarylether resin (PEN) (IDEMITSU OIL: PEN ID300HF), (7) polyamide-imide resin (PAI) (TEIJIN Amoco Engineering Plastic: Torlon 4000TF), (8) polyetherimide resin (PEI) (General Electric: ULTEM 1000), (9) polyether sulfonic resin (PES) (BASF: Ultrason E),

(10) tetrafluoroethylene resin (PTFE (A)) (Mitsui Dupont Fluorochemical: Teflon 7J for molding),

(11) tetrafluoroethylene resin (PTFE (B)) (KITAMURA: KTL 610 for lubrication),

(12) lithium phosphate: $Li_2PO_4$ (Wako Junyaku Kogyo: reagent),

(13) calcium phosphate: $Ca_3(PO_4)_2$ (Wako Junyaku Kogyo: reagent),

(14) magnesium phosphate: $Mg_3(PO_4)_2$ (Wako Junyaku Kogyo: reagent),

(15) aluminum phosphate: $AlPO_4$ (Wako Junyaku kogyo: reagent),

(16) para aromatic polyamide fiber (P-aromatic PA fiber) (Japan Aramid: Twaron Micro 1088, length: 0.25 mm),

(17) meta aromatic polyamide fiber (m-aromatic PA fiber) (TEIJIN: CONEX cut fiber 2 de, fiber length 1 mm),

(18) carbon black (LION: KETJEN EC-X)

(19) graphite (Lonza: KS-6)

(EXAMPLES 1–15)

Raw materials shown in Table 1 were supplied into a Henschel mixer at the rates (weight percent) shown in Table 1 and sufficiently mixed together. The mixture obtained was supplied into a twin-screw melt extruder, in which the mixture was pelletized by melting, mixing and extruding with the cylinder heated to 300°–410° C. and rotated at 100 rpm. The pellets obtained were formed into ring-shaped test pieces 28 mm in outer diameter, 20 mm in inner diameter and 5 mm wide by heating the pellets to 300° C. in a mold heated to 140°–200° C. under the injection pressure of 800 kgf/cm². They were then subjected to a high-temperature radial friction/wear test.

(High-Temperature Radial Friction/Wear Test)

Ring-shaped test pieces were each fitted on a mating member, which was a rotary shaft made of aluminum alloy JIS A5056 (surface roughness 3.2S) and pressed against the outer periphery of the mating member under a load of 3.5 kgf/cm², while controlling the surface temperature of the rotary shaft at 200° C. A torque meter was mounted on the rotary shaft, and the rotary shaft was rotated continuously for 50 hours at a peripheral speed of 2.8 m/min.

After the test, the wear (specific wear rate $10^{-10}$ cm³/(kgf.m)) of each test piece and the torque (kgf.cm) of the rotary shaft were measured. Also, the degree of damage to the surface of the aluminum alloy mating member was observed. The degree of damage was evaluated in three stages, i.e. no damage (O), slightly damaged (Δ), damaged (X). The results are shown in Table 3.

wear resistance than a conventional heat-resistant, lubricative resin composition. It much less attacks or damages a mating member of a soft alloy such as aluminum alloy especially at high temperatures. The sliding bearing molded from this resin composition has all the properties the resin composition has.

TABLE 1

| Component | No. | \multicolumn{15}{c}{Examples} |
| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PPS Resin | (1) | 45 | 49 | 51 | 51 | 47 | 42 | 46 | — | — | — | — | — | — | — | — |
| PPS Resin | (2) | — | — | — | — | — | — | — | 38 | — | — | — | — | — | — | — |
| TP I | (3) | — | — | — | — | — | — | — | — | 43 | 32 | 25 | 38 | — | — | — |
| PEK - 1 | (4) | — | — | — | — | — | — | — | — | — | — | — | — | 43 | — | — |
| PEK - 2 | (5) | — | — | — | — | — | — | — | — | — | 11 | 13 | — | — | — | — |
| PEN | (6) | — | — | — | — | — | — | — | — | — | — | — | — | — | 43 | — |
| PAI | (7) | — | — | — | — | — | — | — | — | — | — | — | — | — | — | 60 |
| PEI | (8) | — | — | — | — | — | — | — | — | — | — | 5 | — | — | — | — |
| PES | (9) | — | — | — | — | — | — | — | — | — | — | — | 5 | — | — | — |
| PTFE (A) | (10) | — | 28 | 26 | 26 | 26 | 26 | 16 | — | — | — | — | — | — | — | — |
| PTFE (B) | (11) | 39 | — | — | — | — | — | — | 30 | 26 | 26 | 26 | 26 | 31 | 26 | 20 |
| Lithium phosphate | (12) | 16 | 23 | 8 | 14 | 18 | 23 | 29 | 18 | 23 | 23 | 23 | 23 | 22 | 23 | 16 |
| Calcium phosphate | (13 | — | — | — | — | — | — | — | — | — | — | — | — | — | — | — |
| Magnesium phosphate | (14) | — | — | — | — | — | — | | | | | | | | | |
| Aluminum phosphate | (15) | — | — | — | — | — | — | — | — | — | — | — | — | — | — | — |
| P- aromatic PA fiber | (16) | — | — | 15 | 9 | 9 | 9 | 9 | — | 8 | 8 | 8 | 8 | 4 | 8 | 4 |
| m- aromatic PA fiber | (17) | — | — | — | — | — | — | — | 3 | — | — | — | — | — | — | — |
| Carbon black | (18) | — | — | — | — | — | — | — | 4 | — | — | — | — | — | — | — |
| Graphite | (19) | — | — | — | — | — | — | — | 7 | — | — | — | — | — | — | — |

(COMPARATIVE EXAMPLES 1–8)

Test pieces were formed in the same way as in the Examples except the contents of raw materials (shown in Table 2). They were subjected to the same high-temperature radial friction/wear test. Specific wear rate, torque of the rotary shaft and the degrees of damage were measured. The results are shown in Table 3.

As is apparent from the results shown in Table 3, wear rate was large in Comparative Examples 1–8. Comparative Examples 1, 5, 6 and 8 damaged the mating member of aluminum alloy.

Comparative Examples 5–7, which contained calcium phosphate, magnesium phosphate and aluminum phosphate, respectively, were markedly higher in wear rate than Example 6, which contained substantially the same amount of lithium phosphate.

In contrast, Examples 1–15, which satisfy all the requirements of the invention, were extremely low both in wear rate and rotating torque. Also, they never damaged the mating member of aluminum alloy. For Examples 3–15, which contained a predetermined amount of aromatic polyamide fiber besides lithium phosphate, torque and wear were both low and no damage was observed to the mating aluminum alloy member as with the other Examples.

The volume resistivity of Example 8 was $7 \times 10^3$ Ωcm, which shows that this composition is a semiconductor.

The heat-resistant, lubricative resin composition according to this invention, comprising a heat-resistant thermoplastic resin as a main component, and predetermined amounts of a tetrafluoroethylene, lithium phosphate and aromatic polyamide fiber, is lower in friction and higher in

TABLE 2

| Component | No. | \multicolumn{8}{c}{Comparative example} |
| | | 1 | 2 | 3 | 4 | 5 | 6 | 7 | 8 |
|---|---|---|---|---|---|---|---|---|---|
| PPS Resin | (1) | 67 | 62 | 58 | 60 | 41 | 43 | 43 | 65 |
| PPS Resin | (2) | — | — | — | — | — | — | — | — |
| TPI | (3) | — | — | — | — | — | — | — | — |
| PEK-1 | (4) | — | — | — | — | — | — | — | — |
| PEK-2 | (5) | — | — | — | — | — | — | — | — |
| PEN | (6) | — | — | — | — | — | — | — | — |
| PAI | (7) | — | — | — | — | — | — | — | — |
| PEI | (8) | — | — | — | — | — | — | — | — |
| PES | (9) | — | — | — | — | — | — | — | — |
| PTFE(A) | (10) | 28 | 28 | 28 | 26 | 25 | 26 | 25 | 5 |
| PTFE(B) | (11) | — | — | — | — | — | — | — | — |
| Lithium phosphate | (12) | 5 | 10 | 14 | 5 | — | — | — | 20 |
| Calcium phosphate | (13) | — | — | — | — | 26 | — | — | — |
| Magnesium phosphate | (14) | — | — | — | — | — | 22 | — | — |
| Aluminum phosphate | (15) | — | — | — | — | — | — | 23 | — |
| P-aromatic PA fiber | (16) | — | — | — | 9 | 8 | 9 | 9 | 10 |
| m-aromatic PA fiber | (17) | — | — | — | — | — | — | — | — |
| Carbon black | (18) | — | — | — | — | — | — | — | — |
| Graphite | (19) | — | — | — | — | — | — | — | — |

TABLE 3

|  | Mating number: A5056 | | |
|---|---|---|---|
| Test items No. | Amount of wear * | Rotaing torque (kgf · cm) | Damage on mating member |
| Examples | | | |
| 1 | 140 | 0.17 | ○ |
| 2 | 100 | 0.12 | ○ |
| 3 | 220 | 0.22 | ○ |
| 4 | 210 | 0.22 | ○ |
| 5 | 120 | 0.17 | ○ |
| 6 | 100 | 0.14 | ○ |
| 7 | 180 | 0.16 | ○ |
| 8 | 180 | 0.21 | ○ |
| 9 | 240 | 0.15 | ○ |
| 10 | 220 | 0.14 | ○ |
| 11 | 220 | 0.15 | ○ |
| 12 | 260 | 0.15 | ○ |
| 13 | 190 | 0.17 | ○ |
| 14 | 150 | 0.14 | ○ |
| 15 | 240 | 0.22 | ○ |
| Comparative examples | | | |
| 1 | 770 | 0.31 | △ |
| 2 | 480 | 0.26 | ○ |
| 3 | 360 | 0.20 | ○ |
| 4 | 310 | 0.22 | ○ |
| 5 | 380 | 0.14 | ○ |
| 6 | 420 | 0.22 | △ |
| 7 | 400 | 0.21 | ○ |
| 8 | >1600 | 0.43 | X |

What is claimed is:

1. A heat-resistant, lubricative resin composition comprising 35–74% by weight of at least one heat-resistant thermoplastic resin selected from the group consisting of polyphenylene sulfide resins, thermoplastic polyimide resins having repeating units expressed by the Formula below, polyether ketone resins, polycyanoarylether resins, polyamide-imide resins, polyether imide resins and polyether sulfonic resins, 10–45% by weight of a tetrafluoroethylene resin, and 16–30% by weight of lithium phosphate,

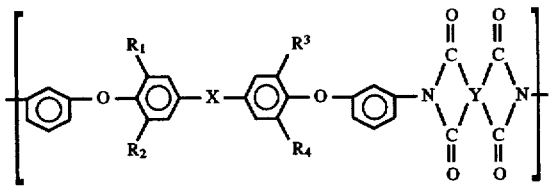

wherein X is a direct bond or a group selected from the group consisting of a hydrocarbon group having 1–10 carbon atoms, a hexafluorinated isoproylidene group, a carbonyl group, a thio group and a sulfonic group; $R_1$–$R_4$ are each independently selected from the group consisting of hydrogen, lower alkyl groups with 1–5 carbon atoms, lower alkoxy groups with 1–5 carbon atoms, chlorine and bromine; and Y is at least one tetravalent group selected from the group shown by the following formulas

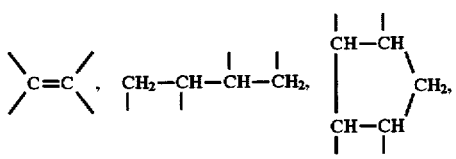
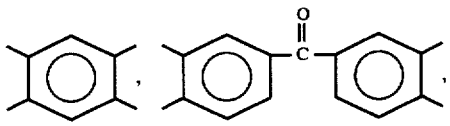
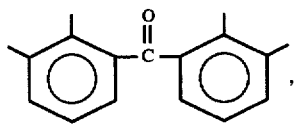
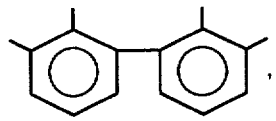
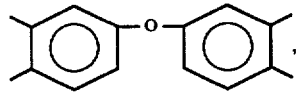
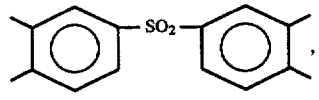
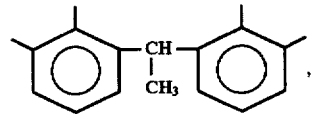
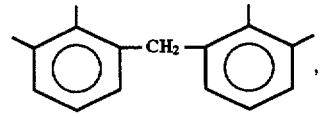
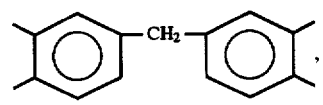
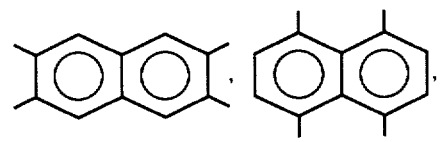
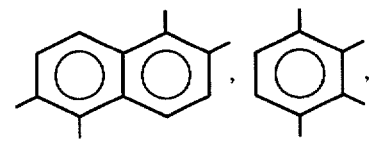

-continued

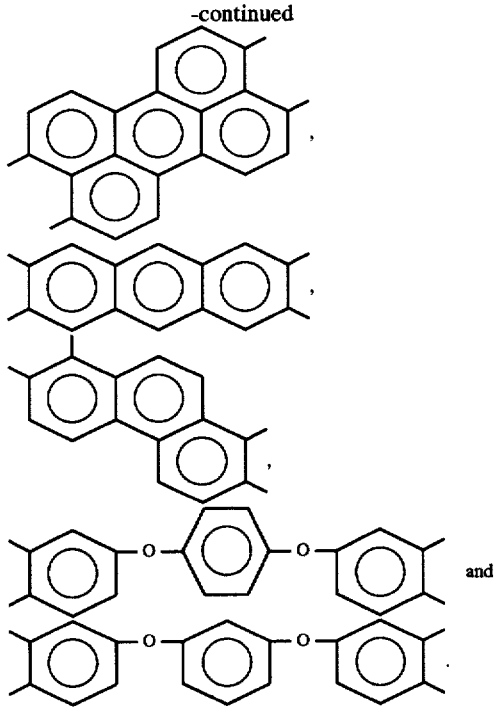

and

2. A heat-resistant, lubricative resin composition comprising 35–80% by weight of the heat-resistant thermoplastic resin as claimed in claim 1, 10–45% by weight of a tetrafluoroethylene resin, 8–30% by weight of lithium phosphate, and 2–20% by weight of aromatic polyamide fiber.

3. A heat-resistant sliding bearing formed from the heat-resistant, lubricative resin composition as claimed in claim 1.

4. A heat-resistant sliding bearing formed from the heat-resistant, lubricative resin composition as claimed in claim 2.

5. A heat-resistant, lubricative resin composition as claimed in claim 1, comprising 15–45% by weight of a tetrafluoroethylene resin.

* * * * *